US012546906B2

(12) United States Patent
Meilahti

(10) Patent No.: US 12,546,906 B2
(45) Date of Patent: Feb. 10, 2026

(54) COLLIMATOR FOR A RADIATION DETECTOR

(71) Applicant: Oxford Instruments Technologies Oy, Espoo (FI)

(72) Inventor: Tomi Meilahti, Helsinki (FI)

(73) Assignee: OXFORD INSTRUMENTS TECHNOLOGIES OY, Espoo (FI)

( * ) Notice: Subject to any disclaimer, the term of this patent is extended or adjusted under 35 U.S.C. 154(b) by 356 days.

(21) Appl. No.: 18/323,708

(22) Filed: May 25, 2023

(65) Prior Publication Data

US 2023/0393290 A1    Dec. 7, 2023

(30) Foreign Application Priority Data

Jun. 1, 2022 (FI) ..................... 20225481

(51) Int. Cl.
*G01T 1/24* (2006.01)
(52) U.S. Cl.
CPC .................... *G01T 1/244* (2013.01)
(58) Field of Classification Search
CPC .. G01T 1/244; G01T 1/02; G01T 1/24; G01T 1/29; G01T 7/00; H01L 31/02
See application file for complete search history.

(56) References Cited

U.S. PATENT DOCUMENTS

| | | |
|---|---|---|
| 5,231,655 A | 7/1993 | Wei et al. |
| 2004/0011960 A1 | 1/2004 | Morooka et al. |
| 2005/0084072 A1 | 4/2005 | Pinchot |
| 2011/0135068 A1 | 6/2011 | Decker |
| 2013/0037717 A1 | 2/2013 | Eggert |
| 2014/0124665 A1 | 5/2014 | Yasui et al. |
| 2015/0270413 A1 | 9/2015 | Zhang et al. |
| 2019/0172964 A1* | 6/2019 | Hermes ................. H10F 39/191 |

FOREIGN PATENT DOCUMENTS

EP     4266326 A1   10/2023

OTHER PUBLICATIONS

Office Action, issued in Finnish Patent Application No. 20225481 dated Apr. 17, 2024.
Finland Search Report for FI20225481 dated Dec. 21, 2022, 2 pages.

* cited by examiner

*Primary Examiner* — David J Makiya
*Assistant Examiner* — Fani Polyzos Boosalis
(74) *Attorney, Agent, or Firm* — NIXON & VANDERHYE

(57) ABSTRACT

Disclosed is a collimator protecting components of a semiconductor radiation detector assembly from excess radiation, including: a first plate defining an opening therethrough, the first plate being made of first material; zero or more intermediate plates each defining an opening therethrough, wherein each intermediate plate is made of respective second material having a higher atomic weight than the first material; a third plate that defines an opening therethrough, and wherein the third plate is made of third material having a higher atomic weight than the second material, wherein the zero or more intermediate plates are arranged between the first plate and the third plate to form a stack of plates so the respective atomic weight of the plates in the stack increases from the first plate towards the third plate and so the respective openings through the plates in the stack are substantially centered with respect to each other.

18 Claims, 5 Drawing Sheets

200

Prepare a first plate that defines an opening therethrough, wherein the first plate is made of first material
202

Prepare one or more intermediate plates that each define an opening therethrough, wherein each intermediate plate is made of respective second material that has a higher atomic weight than the first material
204

Prepare a third plate that defines an opening therethrough, wherein the third plate is made of third material that has a higher atomic weight than any of the second materials
206

Arrange the one or more intermediate plates between the first plate and the second plate to form a stack of plates such that the respective openings therethrough are substantially centered with respect to each other and such that the respetive atomic weight of the plates in the stack increase from the first plate towards the third plate, thereby forming a collimator providing an opening therethrough
208

COLLIMATOR FOR A RADIATION DETECTOR

CROSS-REFERENCE TO RELATED APPLICATIONS

This application claims the priority under 35 USC 119(a) of FI patent application 20225481, filed on Jun. 1, 2022, the entirety of which is incorporated herein by reference.

TECHNICAL FIELD

The present invention relates to a collimator useable for a semiconductor radiation detector such as a silicon drift detector (SDD).

BACKGROUND

A semiconductor radiation detector may be applied as a component for detecting radiation (ionizing radiation or non-ionizing radiation), such as gamma rays, X-rays, ultraviolet (UV) radiation, visible radiation or charged particle radiation, e.g. in an analyzer device, in a spectrometer or in an electron microscope. A semiconductor radiation detector typically serves to output an electrical output signal that is descriptive of the detected level of radiation. In the following, we refer to the electrical output signal from a semiconductor radiation detector as a measurement signal.

A non-limiting example of a radiation detector is a semiconductor drift detector (SDD). FIG. 1 schematically illustrates a circular SDD 100 with a partial cutaway having a set of concentric annular field electrodes 102 arranged on a front surface of a semiconductor block 101 such that they encircle a collector electrode 103 arranged at or close to a common center point of the annular field electrodes 102 and hence at or close to the center of the front surface. The field electrodes 102 are further encircled by a set of annular guard electrodes 104. The illustration of FIG. 1 further depicts guard electrodes 104' and an entrance window electrode 106' embedded on the back surface of the semiconductor block 101, i.e. on a surface that is opposite to the front surface of the semiconductor block 101. It should be likewise noted that the circular SDD design together with annular electrodes 102, 104, 104' applied in the example of FIG. 1 is a non-limiting example and a semiconductor block having a shape different from the circular one and/or electrodes 102, 104, 104' having a shape different from the annular one may be applied instead.

In the SDD 100, the set of field electrodes 102 is arranged to create an electric field inside the semiconductor block 101, where the electric field drives signal charges (e.g. electrons) generated in the semiconductor block 101 due to incident radiation to the collector electrode 103. Typically, the SDD 100 is intended for receiving radiation via a back surface of the semiconductor block 101, which is opposite surface to the front surface facing upwards in the schematic illustration of FIG. 1. The measurement signal that is descriptive of the level of radiation detected by the SDD 100 can be read out from the collector electrode 103. In order to create the electric field in the semiconductor block 101, each of the field electrodes 102 is set to a respective electric potential such that the magnitude of the electric potential (and hence a difference to the electric potential of the collector electrode 103) increases with increasing distance to the collector electrode 103, whereas the guard electrodes 104, 104' may be set to respective electric potentials such that the magnitude of the electric potential (and hence a difference to the electric potential of the collector electrode 103) decreases with increasing distance to the collector electrode 103 in order to create an electric field that passivates the portion of the semiconductor block 101 close to the side surface (e.g. the perimeter) of the semiconductor block 101 e.g. to avoid leakage currents therefrom.

Another example of a semiconductor radiation detector is a PIN diode, which includes a collector electrode embedded on a front surface of a semiconductor block and a back side field electrode embedded on a back surface of the semiconductor block. The back side field electrode may be applied to create a depleted volume within the semiconductor block to drive signal charges (e.g. electrons) generated in the semiconductor block due to incident radiation to the collector electrode.

For practical applications, the semiconductor radiation detectors such as the SDD 100 or the PIN diode is typically provided as a part of a detector head, where the semiconductor radiation detector is mounted on a substrate that provides electrical connections to supply the measurement signal generated in the semiconductor radiation detector to a radiation-detecting appliance. Moreover, to ensure undisturbed measurement, the detector head may be arranged within a gas-tight enclosure where incoming radiation is able to enter the enclosure via a radiation window and meet the back surface of the semiconductor radiation detector. In order to avoid harmful effect that may arise due to high-energy radiation entering the enclosure through the radiation window (such as high spectral background or slow signal pulses), the detector head is typically provided with a collimator arranged between the semiconductor radiation detector and the radiation window such that it allows the incoming radiation to meet only a predefined portion of the back surface of the semiconductor radiation detector while preventing the incoming radiation from entering other parts of the semiconductor radiation detector and/or other components of the detector head within the enclosure. The collimator may be provided, for example, as an annular plate made of material that is able to absorb high-energy radiation, where the plate is arranged on top of the back surface of the semiconductor radiation detector such that the incoming radiation is able to meet a predefined area in central portion of the back surface of the semiconductor radiation detector while substantially protecting other parts of the detector head from the incoming radiation.

Advantageously, the collimator involves a multi-layer structure to ensure absorbing also the fluorescence invoked within the collimator, which would run a risk of introducing noise peaks into the measurement signal if received on the back surface of the semiconductor radiation detector, thereby possibly resulting in misleading measurement results and/or compromised measurement performance. In this regard, the collimator may be considered to comprise a stack of layers arranged on the back surface of the semiconductor radiation detector such that the atomic weight (or atomic mass) of the layers increases from the one closest to the semiconductor radiation detector towards the one closest to the radiation window. Consequently, the outermost layer of the multi-layer structure absorbs the high-energy radiation that enters the enclosure through the radiation window while the high-energy radiation received therein invokes respective fluorescence from the outermost layer, which is again absorbed by the next layer of the multi-layer structure that further generates respective fluorescence towards the next layer in the stack and so on. With a suitable number of layers of suitably selected materials the incoming high-energy radiation is reduced, step by step, into fluorescence at sufficiently low energy that does not substantially disturb the measurements carried out using the semiconductor radiation detector.

Respective thicknesses of the layers of such a multi-layer structure are typically in a range from 50 to 200 micrometers (μm). A widely applied approach for generating layers of such thickness involves usage of a deposition technique such as physical vapor deposition (PVD) or electroplating to introduce the layers of the structure on top of the back surface of the SDD 100 one by one. While deposition techniques such as PVD and electroplating basically allow for controlling thickness of a layer at a nanometer precision, when preparing layers of this thickness these techniques typically fail in providing a layer having truly uniform thickness while they also provide a relatively time-consuming and expensive means for creating such layers. Hence, application of deposition techniques may result in the multi-layer collimator that has radiation-absorption characteristics different from those intended, which may lead to compromised accuracy and/or reliability of the measurements carried using the detector head, while typically also resulting in a manufacturing process that may be infeasible in terms of time and/or cost involved.

SUMMARY OF THE INVENTION

It is therefore an object of the present invention to provide a collimator for protecting components of a radiation detector assembly from a high-energy radiation via absorption of the high-energy radiation to a desired extent in a spatially uniform manner, whereas further objects of the present invention include providing a radiation detector assembly including such a collimator for protecting components of the detector assembly from the high-energy radiation and/or providing a method for manufacturing such a collimator and/or such a radiation detector assembly.

According to an example embodiment, a method for constructing a collimator for protecting components of a semiconductor radiation detector assembly from excess radiation is provided, the method comprising: preparing a first plate that defines an opening therethrough, wherein the first plate is made of first material; preparing zero or more intermediate plates that each define an opening therethrough, wherein each intermediate plate is made of respective second material that has a higher atomic weight than the first material; preparing a third plate that defines an opening therethrough, wherein the third plate is made of third material that has a higher atomic weight than any of said second materials; and arranging the zero or more intermediate plates between the first plate and the third plate to form a stack of plates such that the respective atomic weight of the plates in said stack increases from the first plate towards the third plate and such that the respective openings through the plates in said stack are substantially centered with respect to each other, thereby forming the collimator providing an opening therethrough.

According to another example embodiment, a collimator for protecting components of a semiconductor radiation detector assembly from excess radiation is provided, the collimator comprising: a first plate that defines an opening therethrough, wherein the first plate is made of first material; zero or more intermediate plates that each define an opening therethrough, wherein each intermediate plate is made of respective second material that has a higher atomic weight than the first material; a third plate that defines an opening therethrough, and wherein the third plate is made of third material that has a higher atomic weight than the second material, wherein the zero or more intermediate plates are arranged between the first plate and the third plate to form a stack of plates such that the respective atomic weight of the plates in said stack increases from the first plate towards the third plate and such that the respective openings through the plates in said stack are substantially centered with respect to each other.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE DRAWINGS

The embodiments of the invention are illustrated by way of example, and not by way of limitation, in the figures of the accompanying drawings, where:

FIG. 4 illustrates a method according to an example;

DETAILED DESCRIPTION

Figure 1:
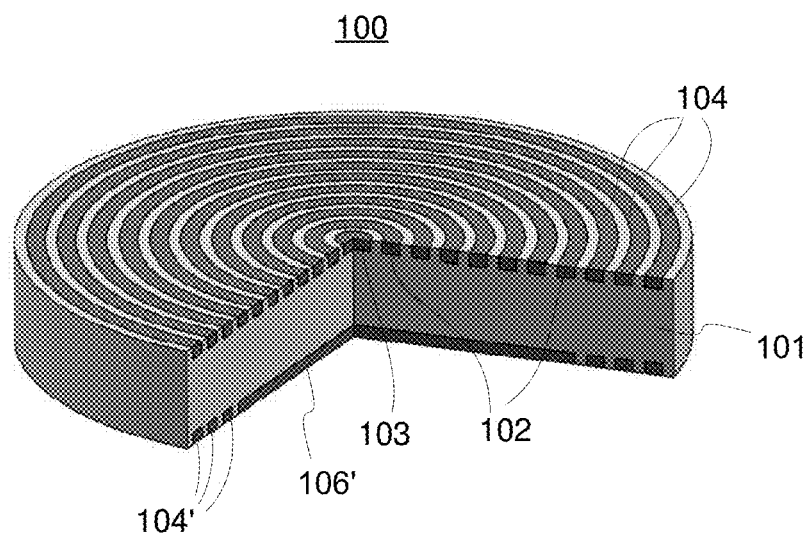
FIG. 1 schematically illustrates a SDD known in the art according to an example.
Figure 2:
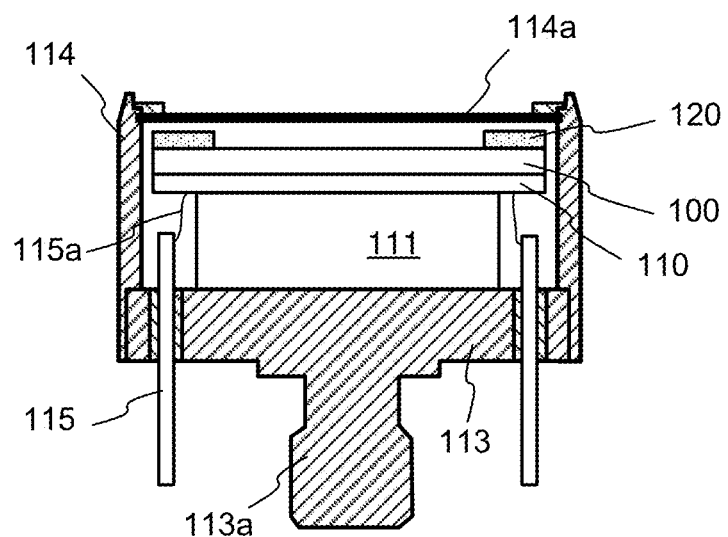
FIG. 2 schematically illustrates a cross-section of a detector head according to an example.

FIG. 2 schematically illustrates a cross-section of a detector head connected to a so-called header that further connects the detector head to a radiation-detecting appliance in order to illustrate some structural elements of the detector head and the header, which together may be referred to as a radiation detector assembly. This illustration of FIG. 2 is, however, a simplified one for improved graphical clarity and it omits possible intermediate shielding layers and other components or features that are not essential for understanding various advantageous features of the present invention. In the example of FIG. 2, the detector head comprises the SDD 100, a substrate 110 and a thermoelectric cooler 111: the SDD 100 is attached on one (first) side of the substrate 110, whereas the opposite (second) side of the substrate 110 is attached to the thermoelectric cooler 111. In the following, various examples are described with reference to the detector head including the SDD 100 as a semiconductor radiation detector, whereas these examples readily generalize into scenarios where the detector head is provided with a semiconductor radiation detector of other type, such as the PIN diode referred to in the foregoing.

When assembled on the header, the detector head is supported by a base plate 113 having a protruding attachment mechanism 113a for mounting the radiation detector assembly to the radiation-detecting appliance. The detector head may be covered by a detector can 114, where the base plate 113 and the detector can 114 may provide a gas-tight enclosure around the detector head. The front face of the detector can 114 may have an opening covered by a radiation window 114a to enable the incoming radiation to enter the enclosure and meet the back surface of the SDD 100 arranged inside the enclosure, which results in the SDD 100 supplying the measurement signal that is descriptive of the incident radiation.

FIG. 2 further depicts contact pins 115 that go through respective holes arranged in the base plate 113, which contact pins 115 are electrically isolated from the base plate 113 by respective insulator sleeves. The base plate 113, the attachment mechanism 113a and the contact pins 115 may be considered as components of the header. The contact pins 115 may be arranged in a circle or in another suitable constellation such that they surround the thermoelectric cooler 111 and each of the contact pins 115 may be electrically coupled to the SDD 100 to enable supplying the measurement signal from the SDD 100 to the radiation-detecting appliance via the contact pins 115. As a non-limiting example in this regard, the illustration of FIG. 2 shows the electrical coupling between the contact pins 115 and the substrate provided via respective bonding wires 115a, whereas the substrate may be further provided with electrical couplings to the SDD 100. FIG. 2 further illustrates a collimator 120 that serves to protect components within the enclosure from excess radiation via allowing the incoming radiation to meet only a predefined portion in central area of the back surface of the SDD 100 while preventing the incoming radiation from entering other parts of the SDD 100 and/or other components of the detector head arranged inside the enclosure. In this regard, the collimator 120 may be considered as an element of the detector head. In the example of FIG. 2, the collimator 120 is provided as an annular plate (e.g. a ring) arranged on the back surface of the SDD 100 such that its outer perimeter is substantially aligned with the outer perimeter of the (substantially circular) back surface of the SDD 100 while its inner perimeter defines a circular opening of a predefined size, which matches the size of the portion of the central area of the back surface of the SDD 100 intended for reception of the incident radiation.

Figure 3A:
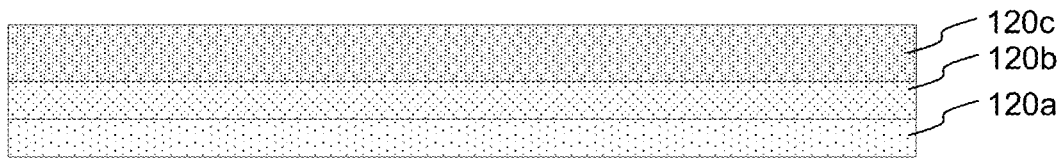
FIG. 3A schematically illustrates a cross-section the collimator according to an example.

FIG. 3A schematically illustrates a cross-section the collimator 120 according to an example. In an example, the collimator 120 may constitute an annular plate that involves a multi-layer structure, which may be considered as a stack of layers or as a stack of plates that are attached to each other and arranged on the back surface of the SDD 100 such that the incident radiation is able to reach the back surface of the SDD 100 via the circular opening of the predefined size defined by the annular plate. The example of FIG. 3A shows a three-layer structure including a first plate 120a, a second plate 120b and a third plate 120c, where each plate 120a, 120b, 120c defines a respective circular opening of the predefined size therethrough. In the example of FIG. 3A, the first plate 120a is intended for facing the back surface of the SDD 100 and the third plate 120c is intended for facing the opposite direction (e.g. a direction of the radiation window 114a). The second plate 120b may be also referred to as an intermediate plate due its position between the first plate 120a and the third plate 120c. While the example illustrated in FIG. 3A includes three plates (or layers), in other examples the number of plates (and hence the number of layers) may be any number greater than three, e.g. four, five, six, etc. Conceptually, a multi-layer structure that involves more than three plates may be considered to consist of the first plate 120a, the third plate 120c and one or more intermediate plates 120b arranged between the first plate 120a and the third plate 120c.

The atomic weight of the material applied to provide each of the plates 120a, 120b, 120c increases from the first plate 120a towards the third plate 120c and/or, vice versa, the atomic weight of the material applied to each of the plates 120a, 120b, 120c decreases from the third plate 120c towards the first plate 120a. Consequently, the third plate 120c absorbs the high-energy incident radiation while the high-energy radiation absorbed therein generates fluorescence at an energy that is lower than that of the radiation absorbed by the third plate 120c. The intermediate plate 120b, in turn, absorbs the fluorescence generated in the third plate 120c, which results in fluorescence at further reduced energy being generated in the intermediate plate 120b. Yet further, the fluorescence generated in the intermediate plate 120b is absorbed by the first plate 120a, where this radiation results in fluorescence at yet further reduced energy being generated. With suitable selection of respective materials and thickness of the first plate 120a, the intermediate plate 120b and the third plate 120c, the fluorescence generated in the first plate 120a finally reaches the back surface of the SDD 100 at an energy level that is low enough not to disturb the measurement carried out using the SDD 100.

Figure 3B:
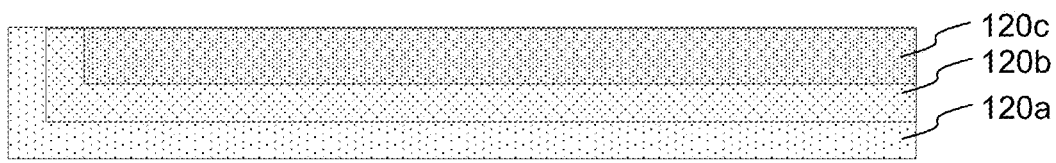
FIG. 3B schematically illustrates a cross-section the collimator according to an example.

FIG. 3B schematically illustrates a cross-section of the collimator 120 according to another example that involves a single intermediate plate 120b, where each of the first plate 120a and the intermediate plate 120b is provided with a respective rim in a portion of the respective plate 120a, 120b that defines the respective circular opening therethrough and hence serves as an inner perimeter of the respective plate 120a, 120b. In this regard, the first plate 120a may comprise a first rim that projects to a lateral direction, where the first rim may have a thickness that is substantially the same as the thickness of the first plate 120a and where a first side of the first rim is facing the opening through the first plate 120a and a second side of the first rim is facing the opposite direction. The first side of the first rim may define a circular opening of the predefined size through the first plate 120a, whereas the second side of the first rim may define a circular protrusion having a size substantially matching the size of the circular opening in the intermediate plate 120b. The intermediate plate 120b may comprise a second rim that likewise projects to the lateral direction, where the second rim may have a thickness that is substantially the same as the thickness of the intermediate plate 120b and where a first side of the second rim is facing the opening through the second plate 120b and a second side of the second rim is facing the opposite direction. The first side of the second rim may define a circular opening through the intermediate plate 120b that substantially matches the size of the circular protrusion defined by the second side of the first rim in the first plate 120a. Moreover, the third plate 120c may be provided without a rim, while it may define an opening that substantially matches the size of the circular protrusion defined by the second side of the second rim in the intermediate plate 120b.

The first rim in the first plate 120*a* may extend in the lateral direction towards the third plate 120*c* by a predefined first distance, whereas the second rim in the intermediate plate 120*b* may extend in the lateral direction towards the third plate 120*c* by a second distance. The first distance may be also referred to as a height of the first rim and the first distance may substantially match the combined thickness of the intermediate plate 120*b* and the third plate 120*c*. The second distance may be also referred to as a height of the second rim and it may substantially match the thickness of the third plate 120*c*.

Consequently, the respective rims provided in the first plate 120*a* and in the intermediate plate 120*b* may serve at least the following purposes:

The respective rims provided in the first plate 120*a* and in the intermediate plates 120*b* result in the layer structure described above also for the surface of the opening through (i.e. the inner perimeter of) the collimator 120, which may be advantageous in further absorbing fluorescence generated within the collimator 120.

The respective rims provided in the first plate 120*a* and in the intermediate plate 120*b* may further facilitate accurate and convenient positioning of the plates 120*a*, 120*b*, 120*c* with respect to each other when assembling them into the multi-layer structure that constitutes the collimator 120.

While described above with examples that involves a three-layer structure with a single intermediate plate 120*b*, the collimator 120 according to the example of FIG. 3B readily generalizes into one that involves one or more intermediate plates 120*b*. In such a scenario the first plate 120*a* may have the first rim of the kind described above with references to the example of FIG. 3B, whereas and each intermediate plate 120*b* may have a respective second rim that projects to the lateral direction towards the third plate 120*c* and that has a thickness that is substantially the same as the thickness of the respective intermediate plate 120*b*, where the opening-facing (first) side of the respective second rim in the respective intermediate plate 120*b* may define a circular opening through the respective intermediate plate 120*b* and the opposite (second) side of the respective second rim may define a circular protrusion for mounting an adjacent plate into the stack of plates, where the adjacent plate is provided with a circular opening having a size substantially matching that of the protrusion. Herein, the adjacent plate in the stack is the one in direction of the third plate 120*c* and it may comprise another intermediate plate 120*b* (also provided with a respective second rim) or the third plate 120*c* (provided without a rim).

Still referring to the generalized example involving one or more intermediate plates 120*b*, the first rim provided in the first plate 120*a* may extend in the lateral direction towards the third plate 120*c* by the first distance that substantially matches the combined thickness of the one or more intermediate plates 120*b* and the third plate 120*c*, whereas each second rim in respective one or more intermediate plates 120*b* may extend in the lateral direction towards the third plate 120*c* by a respective second distance that matches the combined thickness of any further intermediate plates between the respective intermediate plate 120*b* and the third plate 120*c*.

Figure 3C:
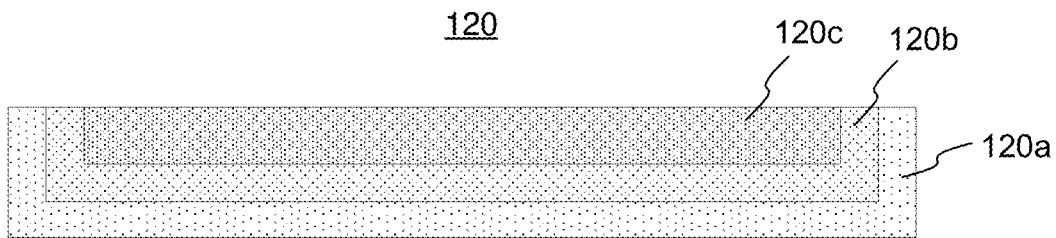
FIG. 3C schematically illustrates a cross-section the collimator according to an example.

FIG. 3C schematically illustrates a cross-section of the collimator 120 according to further example that involves a single intermediate plate 120*b*, where each of the first plate 120*a* and the intermediate plate 120*b* is provided with one rim in a portion of the respective plate 120*a*, 120*b* that defines the respective circular opening therethrough and hence serves as an inner perimeter of the respective plate 120*a*, 120*b* and another rim in a portion of the respective plate 120*a*, 120*b* that defines the outer perimeter of the respective plate 120*a*, 120*b*. Respective thickness and heights of the first rim provided in the first plate 120*a* and the second rim provided in the intermediate plate 120*b* described in context of the example of FIG. 3B apply to the respective thicknesses and heights of the two rims provided at inner and outer perimeters of the first plate 120*a* and to respective thicknesses and heights of the two rims provided at inner and outer perimeters of the intermediate plate 120*b* according to the example of FIG. 3C, mutatis mutandis. Moreover, also the structure according to the example of FIG. 3C that involves a single intermediate plate 120*b* readily generalizes into a structure that involves one or more intermediate plates 120*b* along the lines described in the foregoing for the structure according to the example of FIG. 3B, mutatis mutandis.

The examples provided in the foregoing describe the collimator 120 as a multi-layer annular plate that defines a circular opening of the predefined size therethrough for the incoming radiation to reach the (substantially circular) back surface of SDD 100. This is, however, a non-limiting example that generalizes into the collimator 120 that involves a multi-layer structure that defines an opening of a predefined shape and size therethrough, where the shape and size of the opening may be chosen in dependence of the shape and size of the back surface of the semiconductor radiation detector the collimator 120 serves to protect. In an example, the shape of the opening through the collimator 120 may substantially follow the shape of the outer perimeter of the back surface of the semiconductor radiation detector, whereas in another example the of the opening through the collimator 120 may be different from the shape of the outer perimeter of the back surface of the semiconductor radiation detector. In non-limiting examples regarding the former scenario, the back surface of the semiconductor radiation detector the collimator 120 serves to protect may have a non-circular shape that is substantially rectangular, hexagonal, octagonal, droplet-like, etc. whereas the opening through the collimator 120 may have a substantially similar shape in a desired size. In an example, the shape of the outer perimeter of the collimator 120 may substantially follow the shape of the opening through the collimator 120, whereas in another example the shape of the outer perimeter of the collimator 120 may be different from the shape of the opening through the collimator 120. As an example of the latter, the collimator 120 having a circular opening therethrough may be provided with a rectangular outer perimeter.

In a further example, the semiconductor radiation detector the collimator 120 is designed for may comprise a multi-channel radiation detector, e.g. a multi-channel SDD where the semiconductor block 101 is provided with multiple collector electrodes 103, each provided with a respective set of nested electrodes 102, 104 that substantially surround the respective collector electrode 103, where each arrangement of a collector electrode 103 with the respective surrounding nested electrodes 102, 104 constitutes a respective channel of the multi-channel SDD. In such a scenario, in an example, a separate collimator 120 having an opening of suitable shape and size therethrough may be arranged for protection of each of the channels, whereas in another example the collimator 120 for protecting such a multi-channel semiconductor radiation detector may be provided as a single entity that has a respective opening of suitable shape and size for each of the channels.

Along the lines described in the following, the collimator 120 may be constructed via separately preparing the first plate 120a, the one or more intermediate plates 120b and the third plate 120c and joining them together to form the collimator 120. This may be accomplished, for example, via a method 200 illustrated in FIG. 4 and outlined in the following:

- Prepare the first plate 120a that is made of first material and that defines an opening therethrough (block 202);
- Prepare the one or more intermediate plates 120b that are each made of respective second material and that define a respective opening therethrough (block 204);
- Prepare the third plate 120c that is made of third material and that defines an opening therethrough (block 206);
- Arrange the one or more intermediate plates 120b between the first plate 120a and the third plate 120c into the stack of plates such that the respective openings therethrough are substantially centered with respect to each other and such that the respective atomic weights of the plates (120a, 120b, 120c) in said stack increases from the first plate (120a) towards the third plate (120c), thereby forming the collimator 120 that provides the opening therethrough (block 208).

Respective operations of blocks 202, 204 and 206 may be carried out in an order different from the one described above, whereas the method 200 may include one or more further steps in addition to the ones described above. Moreover, respective operations of blocks 202 to 208 may be varied or complemented in a number of ways without departing from the scope of the present disclosure, e.g. as described in the examples provided in the foregoing and/or in the following.

The respective materials and thicknesses applied for the first plate 120a, the one or more intermediate plates 120b and the second plate 120c and may be chosen in view of the desired radiation-absorption characteristics and/or intended application of the collimator 120, as far as the above-described requirement of the increasing atomic weight of the respective materials applied for the plates 120a, 120b, 120c from the first plate 120a towards the third plate 120c is adhered to. In a non-limiting example that involves a single intermediate plate 120b, the following materials and thicknesses may be applied for the first plate 120a, the intermediate plate 120b and the third plate 120c:

- For the first plate 120a, the first material may comprise aluminium and the thickness of the first plate 120a may comprise a thickness selected from a range from 75 to 125 micrometers (μm), e.g. 100 μm.
- For the (single) intermediate plate 120b, the second material may comprise titanium and the thickness of the intermediate plate 120b may comprise a thickness selected from a range from 50 to 100 μm, e.g. 75 μm.
- For the second plate 120c, the third material may comprise tantalum and the thickness of the third plate 120c may comprise a thickness selected from a range from 125 to 175 μm, e.g. 150 μm.

In another example, two intermediate plates 120b may be applied, where the first plate 120a may be made of aluminium and have a thickness around 70 μm, an intermediate plate 120b adjacent to the first plate 120a may be made of titanium and have thickness around 25 μm, an intermediate plate 120b adjacent to the third plate 120c may be made of chromium and have a thickness around 30 μm, whereas the third plate 120c may be made of tantalum and have a thickness around 150 μm.

As pointed out above, however, these examples concerning the materials applied for the plates 120a, 120b, 120c and their thicknesses serve as non-limiting examples and different choices of materials for the respective plates 120a, 120b, 120c may be applied without departing from the scope of the present disclosure, as far as the requirement of the increasing atomic weight of the material from the first plate 120a towards the third plate 120c through the stack of plates is adhered to, whereas the choices of materials may have an implication on the respective thicknesses of the plates 120a, 120b and 120c in order to provide desired extent radiation absorption at each of the plates 120a, 120b, 120c.

The lateral size of the collimator 120 and the size of the opening therethrough (and, consequently, the lateral sizes of the plates 120a, 120b and 120c and the respective sizes of the openings therethrough) depend e.g. on the lateral size of the applied semiconductor radiation detector (e.g. the size of the back surface of the SDD 100) and/or dimensions of other components of the detector assembly, such as size of the detector can 114. In a non-limiting example that assumes a substantially circular opening through the collimator 120, the diameter of the opening may be in a range from a fraction of a millimeter to a few centimeters, whereas the overall lateral size of the collimator 120 may be chosen in view of the size of the detector can 114.

Referring now back to operations that pertain to blocks 202, 204 and 206, the first plate 120a, the one or more intermediate plates 120b and the third plate 120c may be constructed, for example, via the following procedure:

- machining a sheet of the first material into a first preliminary plate of desired shape that defines the opening of desired shape and size therethrough and machining the first preliminary plate into desired thickness to form the first plate 120a,
- machining a sheet of the respective second material into a respective second preliminary plate of desired shape that defines the opening of desired shape and size therethrough and machining the respective second preliminary plate into desired thickness to form the respective intermediate plate 120b,
- machining a sheet of the third material into a third preliminary plate of desired shape that defines the opening of desired shape and size therethrough and machining the third preliminary plate into desired thickness to form the third plate 120c, Hence, in each of the above-described steps the sub-step of machining a respective sheet of material into the respective preliminary plate may result in a respective preliminary plate that has a thickness that is larger than the desired thickness of the respective plate 120a, 120b, 120c, whereas the sub-step of machining the respective preliminary plate into the respective desired thickness may be applied to remove excess material from the respective preliminary plate in order provide the respective plate 120a, 120b, 120c in respective desired thickness.

In a scenario that involves constructing the collimator 120 according to the example of FIG. 3A, in an example, the sheet of respective one of the first, second and third materials may be readily provided in respective desired thickness, thereby rendering the sub-step of machining the respective preliminary plate into the respective desired thickness unnecessary. Still referring to the scenario that involves constructing the collimator 120 according to the example of FIG. 3A, the order of carrying out the sub-steps of machining the respective one of the first, second and third material into the respective preliminary plate and the sub-step of machining the respective preliminary plate into the respective desired thickness may be reversed, mutatis mutandis.

In a scenario that involves constructing the collimator 120 where the first plate 120a and at least one intermediate plate 120b are provided with a respective rim in its inner perimeter that defines the opening therethrough (e.g. one according to the example of FIG. 3B), in an example, the sub-step of machining the respective preliminary plate into the respective plate 120a, 120b may comprise machining the perimeter of the opening through the respective preliminary plate into a thickness that is the sum of the desired thickness of the respective plate 120a, 120b and the height of the respective rim and machining the remainder of the first preliminary plate into the desired thickness such that the rim included therein has a respective desired width. For a plate 120a, 120b that may have a respective rim also in its outer perimeter (e.g. ones according to the example of FIG. 3C) the final step of machining the respective preliminary plate into the desired thickness leaves a rim of desired height and width also in the outer perimeter of the respective preliminary plate.

Herein, the sub-step of machining the sheet of respective material into the respective preliminary plate may involve laser cutting, water jet cutting, etching, or computer numerical control (CNC) milling, whereas the sub-step of machining the respective preliminary plate into the respective desired thickness may comprise CNC milling, laser milling or etching.

Referring now back to operations that pertain to block 208, the aspect of arranging the plates 120a, 120b, 120c into the stack of plates form the collimator 120 may comprise attaching, e.g. bonding, the plates 120a, 120b, 120c to each other to from the stack of plates where the atomic weight applied as the material of the respective plates 120a, 120b, 120c increases from one plate to another from the first plate 120a towards the third plate 120c. In an example that involves a single intermediate plate 120b this may comprise attaching the first plate 120a to a first side of the intermediate plate 120b and attaching the third plate 120c to a second side of the intermediate plate 120b, wherein the second side is the side of the intermediate plate 120b opposite to its first side.

The attachment between the plates 120a, 120b, 120c may be provided using a suitable technique known in the art, e.g. via usage of an adhesive or via application of a welding techniques such as sport welding or ultrasonic welding. In another example of arranging the plates 120a, 120b, 120c into the stack of plates, the plates 120a, 120b, 120c may be pressed against each other. Such an approach may be especially suited in scenarios where the first plate 120a and the one or more intermediate plates 120b are provided with respective rims both in their inner perimeters and their outer perimeters, e.g. in a structure described in the foregoing with references to the example shown in FIG. 3C.

About a Two-Layer Collimator

Figure 5A:
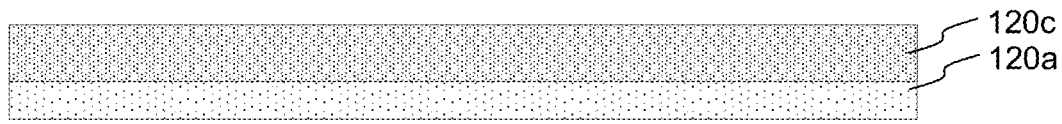
FIG. 5A schematically illustrates a cross-section the collimator according to an example.
Figure 5B:
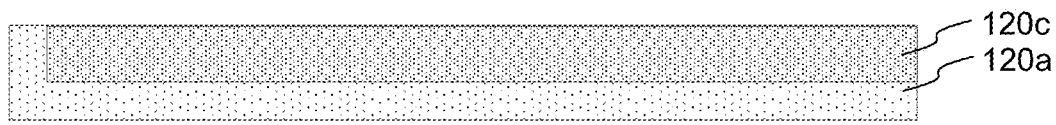
FIG. 5B schematically illustrates a cross-section the collimator according to an example.
Figure 5C:
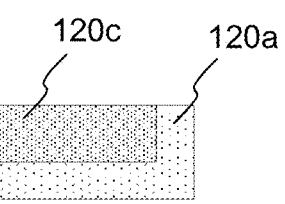
FIG. 5C schematically illustrates a cross-section the collimator according to an example.

While the examples provided in the foregoing describe collimator structures including at least one intermediate plate, in a further example the collimator 120 may be provided without any intermediate plates 120b, as schematically illustrated in FIGS. 5A, 5B and 5C. Hence, the collimator 120 generalizes into one comprising the first plate 120a, the third plate 120c and zero or more intermediate plates arranged between the first plate 120a and the third plate 120c. In an example where the collimator 120 comprises zero intermediate plates 120b (i.e. does not comprise any intermediate plates 120b) the third material applied for preparing the third plate 120c has atomic weight that is higher than that of the first material applied for preparing the first plate 120a and, consequently, the stack of plates is formed from the first plate 120a and the third plate 120c without any intermediate plates 120b therebetween. In such an arrangement, the first plate 120a may be provided without the first rim (as in the example of FIG. 5A), with the first rim provided in its inner perimeter (as in the example of FIG. 5B), or with the respective first rim provided in its inner and outer perimeters (as in the example of FIG. 5C).

In a scenario where the collimator 120 is provided without the intermediate plate 120b (i.e. with zero intermediate plates 120b), the procedure of constructing the collimator 120 according to the method 200 for constructing the collimator assembly may omit operations that pertain to block 204 while operations that pertain to block 208 may involve arranging the first plate 120a and the third plate 120c into the stack of plates such that the respective openings therethrough are substantially centered with respect to each other.

Figure 6:
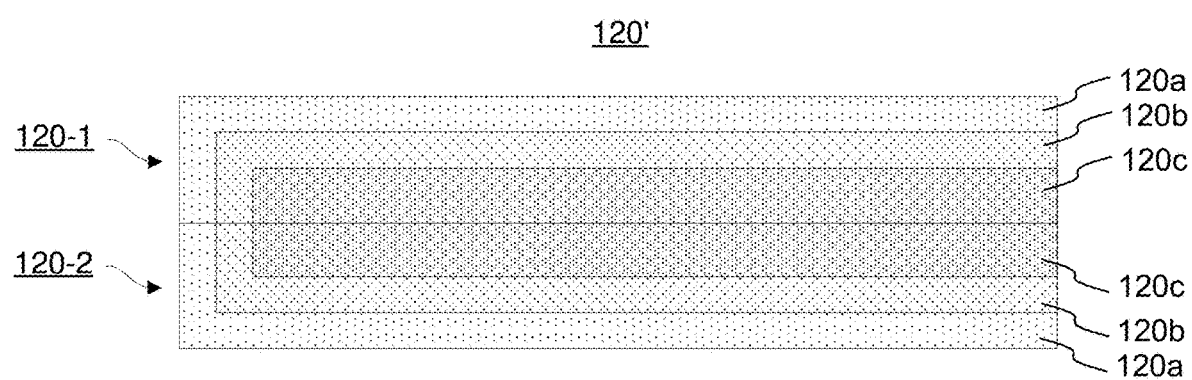
FIG. 6 schematically illustrates a cross-section a collimator assembly according to an example.

FIG. 6 schematically illustrates a cross-section of a collimator assembly 120' according to an example, where the collimator assembly 120' may be provided via arranging two collimators 120 according to the example of FIG. 3B together such that respective third plates 120c of a first collimator 120-1 and a second collimator 120-2 are positioned against each other with the respective first and second rims in the inner perimeters of the respective plates 120a, 120b of the first collimator 120-1 aligned with the respective first and second rims in the inner perimeters of the respective plates 120a, 120b of the second collimator 120-2. In another example, the collimator assembly 120' may be constructed by arranging two collimators 120 according to the example of FIG. 3C together such that their respective third plates 120c are positioned against each other with the respective first and second rims in the inner and outer perimeters of the respective plates 120a, 120b of the first collimator 120-1 aligned with the respective first and second rims in the inner and outer perimeters of the respective plates 120a, 120b of the second collimator 120-2. Similar approach is likewise applicable for constructing the collimator assembly 120' from a pair of collimators according to the example of FIG. 5B or from a pair of collimators according to the example of FIG. 5C, mutatis mutandis.

According to an example, the collimator 120 comprising the multi-layer structure described via a number of examples in the foregoing may be further provided with a coating layer that may cover at least part of the collimator 120. In this regard, the coating layer may cover at least a side of the first plate 120a that is facing the semiconductor radiation detector (e.g. the SDD 100) while the coating layer may further cover at least part of the opening through the collimator 120.

The coating layer may be made of material that has a lower atomic weight than the material applied for the first layer 120a, the coating layer thereby serving as a further absorption layer that may serve to absorb fluorescence generated in the first layer 120a. Non-limiting examples of suitable coating materials include, boron, boron carbide, boron nitride, carbon coatings of various kinds, plastics such as parylene, etc. The coating layer may be introduced via usage of a deposition technique known in the art, such as the PVD or chemical vapor deposition (CVD). The coating layer may further facilitate keeping the plates 120a, 120b, 120c attached to each other, which may be especially useful in scenarios where the attachment is provided by pressing the plates 120a, 120b, 120c against each other.

The method 200 for constructing the multi-layer collimator 120 via separately preparing the first plate 120a, the zero or more intermediate plates 120b and the third plate 120c and arranging the plates 120a, 120b, 120c into the stack of plates to form the multi-layer collimator 120 according to the present disclosure provides a time-saving and cost-efficient approach in comparison to previously known approaches that rely on deposition techniques in forming the layers of the multi-layer structure. Moreover, the method 200 may be especially advantageous in construction of collimators 120 having relatively large lateral size via avoiding bending of the layers of the multi-layer structure with changes in temperature during manufacturing the collimator 120 and/or during operating a radiation detector assembly making use of the collimator 120. Moreover, constructing the collimator 120 according to the present disclosure may further ensure providing each layer of the multi-layer structure at the respective desired layer thickness at an accuracy and uniformity that are substantially improved over that resulting from application of deposition techniques applied in prior art solutions for preparing a multi-layer collimator structure, thereby contributing towards improvement measurement results via usage of a radiation detector assembly making use of the collimator 120 for protecting components of the radiation detector assembly from excess radiation.

The invention claimed is:

1. A method for constructing a collimator for protecting components of a semiconductor radiation detector assembly from excess radiation, the method comprising:
    preparing a first plate that defines an opening therethrough, wherein the first plate is made of first material;
    preparing zero or more intermediate plates that each define an opening therethrough, wherein each intermediate plate is made of respective second material that has a higher atomic weight than the first material;
    preparing a third plate that defines an opening therethrough, wherein the third plate is made of third material that 10 higher atomic weight than any of said second materials; and
    arranging the zero or more intermediate plates between the first plate and the third plate to form a stack of plates such that the respective atomic weight of the plates in said stack increases from the first plate towards the third plate and such that the respective openings through the plates in said stack are substantially centered with respect to each other, thereby forming the collimator providing an opening therethrough,
    wherein the first plate includes a first rim projecting in a lateral direction towards the third plate such that a first side of the first rim defines an opening of predefined shape and size through the first plate and that an opposite side of the first rim defines a protrusion,
    each intermediate plate includes a respective second rim projecting in the lateral direction towards the third plate such that a first side of the respective second rim defines the opening through the respective intermediate plate having shape and size substantially matching those of the protrusion provided in an adjacent plate in said stack of plates and such that an opposite side of the respective second rim defines a protrusion, and
    the opening through the third plate has shape and size substantially matching those of the protrusion provided in the plate adjacent to the third plate in said stack of plates.

2. The method according to claim 1, wherein the respective openings through the plates in said stack have substantially the same shape and size.

3. The method according to claim 2, wherein
preparing the first plate comprises machining a sheet of the first material into a first preliminary plate that defines the opening therethrough and machining the first preliminary plate into a thickness defined for the first plate,
preparing the zero or more intermediate plates comprises, for each intermediate plate, machining a sheet of the respective second material into a respective second preliminary plate that defines the opening therethrough and machining the respective second preliminary plate into a thickness defined for the respective intermediate plate,
preparing the third plate comprises machining a sheet of the third material into a third preliminary plate that defines the opening therethrough and machining the third preliminary plate into a thickness defined for the third plate.

4. The method according to claim 1, wherein
a height of the first rim in the first plate substantially matches the combined thickness of the third plate and any intermediate plates arranged between the first plate and the third plate, and
a height of the respective second rim in each intermediate plate substantially matches the combined thickness of the third plate and any intermediate plates arranged between the respective intermediate plate and the third plate.

5. The method according to claim 4, wherein
a width of the first rim in the first plate is substantially the same as a thickness of the first plate, and
a respective width of a respective second rim in each intermediate plate is substantially the same as a thickness of the respective intermediate plate.

6. The method according to claim 4, wherein
preparing the first plate comprises machining a sheet of the first material into a first preliminary plate that defines the opening therethrough, machining the perimeter of the opening to a thickness that is substantially a sum of a thickness defined for the first plate and a height of the first rim and machining the remainder of the first preliminary plate into the thickness defined for the first plate, thereby forming the first plate that includes the first rim projecting in the lateral direction,
preparing the zero or more intermediate plates comprises, for each intermediate plate, machining a sheet of the respective second material into a respective second preliminary plate that defines the opening therethrough, machining the perimeter of the opening in the respective second preliminary plate to a thickness that is substantially a sum of a thickness defined for the respective intermediate plate and a height of the respective second rim to form the second rim in the respective intermediate plate and machining the remainder of the respective second preliminary plate into the thickness defined for the respective intermediate plate,
preparing the third plate comprises machining a sheet of the third material into a third preliminary plate that defines the opening therethrough and machining the third preliminary plate into a thickness defined for the third plate.

7. The method according to claim 1, wherein
a width of the first rim in the first plate is substantially the same as a thickness of the first plate, and
a respective width of a respective second rim in each intermediate plate is substantially the same as a thickness of the respective intermediate plate.

8. The method according to claim 7, wherein
preparing the first plate comprises machining a sheet of the first material into a first preliminary plate that defines the opening therethrough, machining the perimeter of the opening to a thickness that is substantially a sum of a thickness defined for the first plate and a height of the first rim and machining the remainder of the first preliminary plate into the thickness defined for the first plate, thereby forming the first plate that includes the first rim projecting in the lateral direction, preparing the zero or more intermediate plates comprises, for each intermediate plate, machining a sheet of the respective second material into a respective second preliminary plate that defines the opening therethrough, machining the perimeter of the opening in the respective second preliminary plate to a thickness that is substantially a sum of a thickness defined for the respective intermediate plate and a height of the respective second rim to form the second rim in the respective intermediate plate and machining the remainder of the respective second preliminary plate into the thickness defined for the respective intermediate plate, preparing the third plate comprises machining a sheet of the third material into a third preliminary plate that defines the opening therethrough and machining the third preliminary plate into a thickness defined for the third plate.

9. The method according to claim 1, wherein preparing the first plate comprises machining a sheet of the first material into a first preliminary plate that defines the opening therethrough, machining the perimeter of the opening to a thickness that is substantially a sum of a thickness defined for the first plate and a height of the first rim and machining the remainder of the first preliminary plate into the thickness defined for the first plate, thereby forming the first plate that includes the first rim projecting in the lateral direction, preparing the zero or more intermediate plates comprises, for each intermediate plate, machining a sheet of the respective second material into a respective second preliminary plate that defines the opening therethrough, machining the perimeter of the opening in the respective second preliminary plate to a thickness that is substantially a sum of a thickness defined for the respective intermediate plate and a height of the respective second rim to form the second rim in the respective intermediate plate and machining the remainder of the respective second preliminary plate into the thickness defined for the respective intermediate plate, preparing the third plate comprises machining a sheet of the third material into a third preliminary plate that defines the opening therethrough and machining the third preliminary plate into a thickness defined for the third plate.

10. The method according to claim 1, wherein zero or more intermediate plates comprise zero intermediate plates.

11. The method according to claim 1, wherein zero or more intermediate plates comprise one or more intermediate plates.

12. The method according to claim 11, wherein the one or more intermediate plates comprise a single intermediate plate and wherein
the first plate is made of aluminum and has a thickness chosen from a range from 75 to 125 micrometers,
the single intermediate plate is made of titanium and has a thickness chosen from a range from 50 to 100 micrometers,
the third plate is made of tantalum and has a thickness chosen from a range from 125 to 175 micrometers.

13. The method according to claim 11, wherein arranging the one or more intermediate plates between the first plate and the second plate into said stack of plates comprises attaching the plates to each other in an order where the atomic weight of the respective materials of the first plate, the one or more intermediate plates and the third plate increases from one plate to another from the first plate to the third plate.

14. The method according to claim 13, wherein the one or more intermediate plates comprise a single intermediate plate and wherein said arranging comprises attaching the first plate to a first side of the single intermediate plate and attaching the third plate to a second side of the single intermediate plate.

15. A method comprising:
constructing a first collimator according to claim 1;
constructing a second collimator according to claim 1; and
arranging the first and second collimators into a collimator assembly where the respective first plates of the first and second collimators are positioned against each other and where the respective first and second rims of the first collimator are substantially aligned with respective first and second rims of the second collimator.

16. The method according to claim 1, further comprising depositing a coating layer made of material having atomic weight smaller than that of the first material to cover at least part of the first plate.

17. A collimator for protecting components of a semiconductor radiation detector assembly from excess radiation, the collimator comprising:
a first plate that defines an opening therethrough, wherein the first plate is made of first material;
zero or more intermediate plates that each define an opening therethrough, wherein each intermediate plate is made of respective second material that has a higher atomic weight than the first material; and
a third plate that defines an opening therethrough, wherein the third plate is made of third material that has a higher atomic weight than the second material,
wherein the zero or more intermediate plates are arranged between the first plate and the third plate to form a stack of plates such that the respective atomic weight of the plates in said stack: increases from the first plate towards the third plate and such that the respective openings through the plates in said stack are substantially centered with respect to each other,
wherein the first plate includes a first rim projecting in a lateral direction towards the third plate such that a first side of the first rim defines an opening of predefined shape and size through the first plate and that an opposite side of the first rim defines a protrusion,
each intermediate plate includes a respective second rim projecting in the lateral direction towards the third plate such that a first side of the respective second rim defines the opening through the respective intermediate plate having shape and size substantially matching those of the protrusion provided in an adjacent plate in said stack of plates and such that an opposite side of the respective second rim defines a protrusion, and
the opening through the third plate has shape and size substantially matching those of the protrusion provided in the intermediate plate adjacent to the third plate.

18. The collimator according to claim 17, wherein zero or more intermediate plates comprise one or more intermediate plates and wherein the first plate, the one or more intermediate plates and the third plate are attached to each other to form said stack of plates in an order where the atomic weight of the respective materials of the first plate, the one or more intermediate plates and the third plate increases from one plate to another from the first plate to the third plate.

* * * * *